(12) United States Patent
Helfer

(10) Patent No.: US 10,844,962 B2
(45) Date of Patent: Nov. 24, 2020

(54) VALVE BODY INSERT APPARATUS AND RELATED METHODS

(71) Applicant: Fisher Controls International LLC, Marshalltown, IA (US)

(72) Inventor: Wade Jonathon Helfer, Ames, IA (US)

(73) Assignee: FISHER CONTROLS INTERNATIONAL LLC, Marshalltown, IA (US)

( * ) Notice: Subject to any disclaimer, the term of this patent is extended or adjusted under 35 U.S.C. 154(b) by 209 days.

(21) Appl. No.: 15/145,514

(22) Filed: May 3, 2016

(65) Prior Publication Data

US 2017/0102075 A1   Apr. 13, 2017

Related U.S. Application Data

(60) Provisional application No. 62/238,431, filed on Oct. 7, 2015.

(51) Int. Cl.
| | |
|---|---|
| *F16K 1/22* | (2006.01) |
| *F16K 1/226* | (2006.01) |
| *F16K 27/02* | (2006.01) |
| *F16K 41/02* | (2006.01) |

(52) U.S. Cl.
CPC ............... *F16K 1/22* (2013.01); *F16K 1/224* (2013.01); *F16K 27/0218* (2013.01); *F16K 41/026* (2013.01); *F16K 1/2268* (2013.01)

(58) Field of Classification Search
CPC ........ F16K 1/224; F16K 1/225; F16K 1/2028; F16K 1/2078; F16K 1/2268; F16K 1/2035; F16K 5/0285; F16K 5/0694; F16K 5/0663; F16K 5/0668; F16K 5/0673; F16K 27/0272; F16K 41/026; F16K 5/0485; F16K 41/023; F16K 41/04; F16K 41/043; F16K 41/046; F16K 41/06; F16K 41/063; F16K 41/066; F16K 41/08; F16K 41/083; F16K 41/086; F16K 27/102

See application file for complete search history.

(56) References Cited

U.S. PATENT DOCUMENTS 3,006,598 A * 10/1961 Carr ........................ F16K 1/226
                                                    251/171
3,568,709 A *  3/1971 Fitting ................... F16K 1/2265
                                                    137/375

(Continued)

FOREIGN PATENT DOCUMENTS

DE        4206423 A1 *  9/1993  ............. F16K 5/045
WO   WO 9520116 A1 *  7/1995  ........... F16K 5/0657

*Primary Examiner* — Hailey K. Do
(74) *Attorney, Agent, or Firm* — Hanley, Flight & Zimmerman, LLC

(57) ABSTRACT

Valve body insert apparatus and related methods are described. An example valve includes a valve body made of a first material and having a fluid flow passageway and a first shaft bore. The fluid flow passageway defines a first axis and the first shaft bore defines a second axis that is substantially non-parallel relative to the first axis of the fluid flow passageway. A first insert is positioned in the first shaft bore. The first insert is made of a second material different than the first material such that the second material has a higher corrosion resistance characteristic than the first material.

25 Claims, 6 Drawing Sheets

(56) References Cited

U.S. PATENT DOCUMENTS

| | | | | |
|---|---|---|---|---|
| 4,294,428 A | * | 10/1981 | Okada | F16K 1/2268 |
| | | | | 251/214 |
| 4,406,441 A | * | 9/1983 | Lukesch | F16J 15/3208 |
| | | | | 251/214 |
| 4,544,523 A | * | 10/1985 | McCollough | B22F 7/064 |
| | | | | 138/140 |
| 6,142,173 A | * | 11/2000 | Bekeredjian | F16K 1/2265 |
| | | | | 137/375 |
| 8,469,336 B2 | * | 6/2013 | Nakamura | F16K 1/2268 |
| | | | | 251/214 |

* cited by examiner

VALVE BODY INSERT APPARATUS AND RELATED METHODS

CROSS-REFERENCE TO RELATED APPLICATION

This patent claims the benefit of U.S. Provisional Patent Application Ser. No. 62/238,431, filed on Oct. 7, 2015, titled "Valve Body Insert Apparatus and Related Methods," which is incorporated herein in its entirety.

FIELD OF THE DISCLOSURE

This disclosure relates generally to valves and, more particularly, to valve body insert apparatus and related methods

BACKGROUND

Valves are commonly used in process control systems to control the flow of process fluids. In severe service applications (e.g., chemical industry, refining, petrochemical industry, natural gas, paper and pulp, power industry, etc.), control valves may be subjected to highly corrosive and/or erosive service conditions that can rapidly wear or reduce the operating life of a valve. For example, wetted surfaces of the valve and/or a valve trim of the valve may be exposed to highly corrosive or erosive process fluids (e.g., containing entrained particulate, chlorides from saltwater, etc.) that can damage (e.g., remove material) and/or rapidly wear a surface of a valve made of a low corrosion resistance material such as, for example carbon steel. Such damage is exacerbated in high differential pressure applications because particulate in the fluid may impact the metallic surfaces of the valve and/or the valve trim at relatively high velocities, resulting in a significantly reduced operating life of the valve.

SUMMARY

A rotary valve includes a valve body made of a first material and having a fluid flow passageway and a first shaft bore. The fluid flow passageway defines a first axis and the first shaft bore defines a second axis that is substantially non-parallel relative to the first axis of the fluid flow passageway. A first insert is positioned in of the first shaft bore. The insert is made of a second material different than the first material such that the second material has a higher corrosion resistance characteristic than the first material.

In another example, a rotary valve described herein includes a valve body defining a fluid flow passageway between an inlet and an outlet. The valve body has a drive shaft bore formed on a drive side portion of the valve body. A first insert is positioned in the drive shaft bore. The first insert includes a first counterbore to receive a first bushing. The first counterbore defines a first inner wall to restrict movement of the first bushing and an outer wall positioned on an outer surface of the first insert, where the outer wall is to engage the valve body to position the first insert in the drive shaft bore.

In yet another example, a method includes inserting a first sleeve in a drive shaft bore of a valve body, where the first sleeve defines a first opening to receive a drive shaft, and cladding an inner surface of the valve body defining a fluid flow passageway.

DETAILED DESCRIPTION

Figure 1:
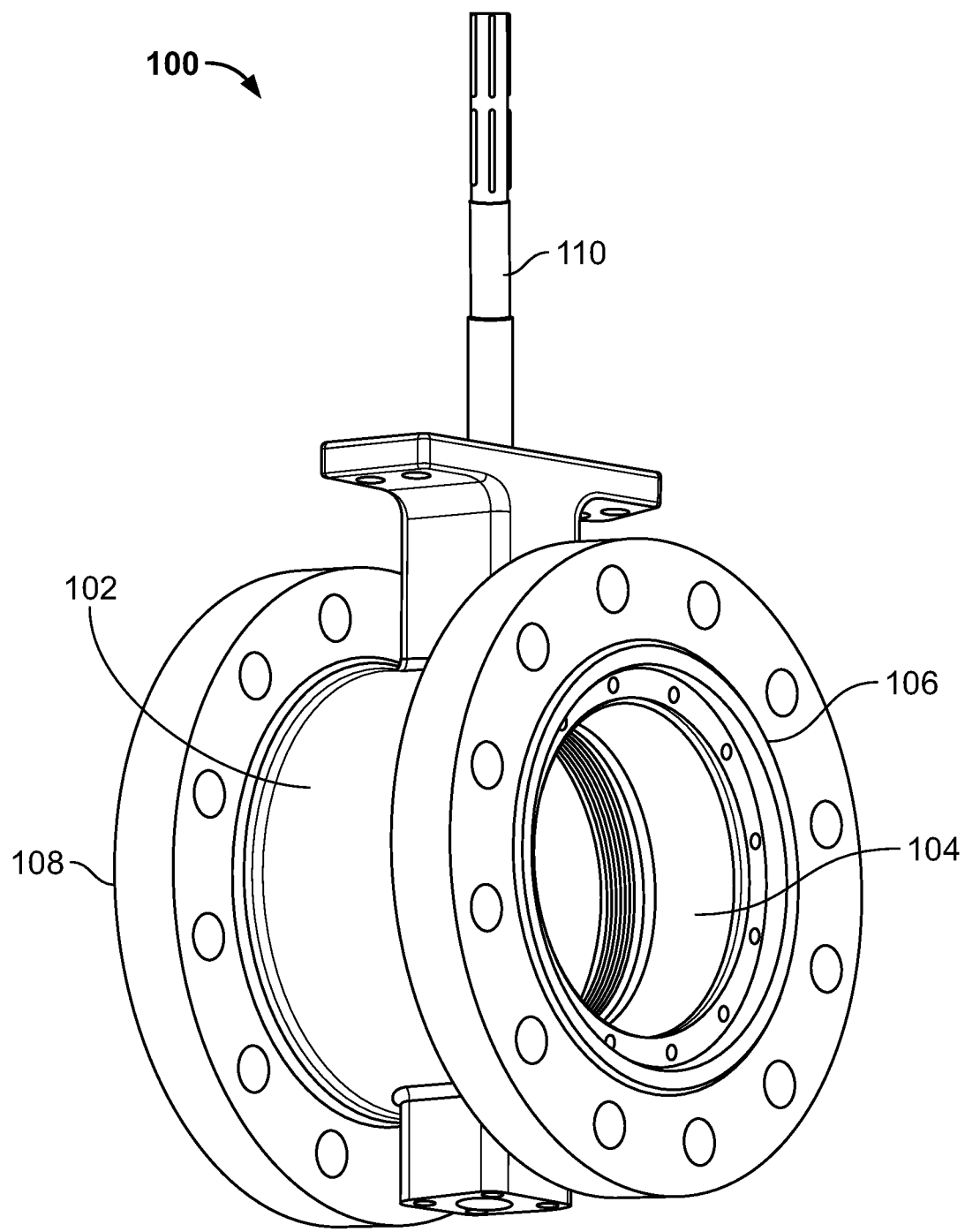
FIG. 1 illustrates an example rotary valve constructed in accordance with the teachings of this disclosure.

A valve body is typically made of carbon steel to reduce manufacturing costs. However, carbon steel has low corrosion or erosion resistance characteristics. In severe service applications, fabricating a valve body composed of a high corrosion or erosion resistant material such as nickel alloy material(s) significantly increases manufacturing costs. Thus, to reduce costs, cladding material composed of highly corrosion or erosion resistant material such as nickel alloy (e.g., Inconel) is applied to wetted surfaces of a valve body that are made of a low corrosion or erosion resistant material such as carbon steel. The cladding material significantly reduces damage and/or wear caused by severely corrosive or erosive process fluids that may otherwise damage surfaces of the valve composed of low corrosion resistant material, thereby increasing the operating life of the valve. Thus, the cladding material is often applied to wetted surfaces of the valve body.

Cladding material is typically coupled to the wetted surfaces of a valve body via fusion or welding. However, in some instances, cladding a shaft bore of a rotary valve body may often be challenging due to, for example, a length of the bore and/or a diameter (e.g., an inside diameter) of the bore. For example, applying cladding material to relatively long bores and/or relatively small diameter bores may be difficult, particularly via welding because a probe tip of the welding tool may not easily fit within the shaft bore. As a result, the constraints associated with the process of attaching the cladding material to the valve body often limits cladding to relatively large rotary valves (e.g., valve sizes having nominal pipe size "NPS" 18 or greater).

Additionally, rotary valves typically employ a bushing or bearing stop to properly align a valve trim (e.g., a closure member) in a flow path of a valve. The bearing stop is positioned within a shaft bore and engages a bearing to prevent movement of the bearing in a vertical and/or lateral direction relative to a flow path of the valve. In some such examples, the bushing is press-fit inside the shaft bore via an interference fit to a specific or target location. An amount of interference required to hold the bearing stop in place makes it difficult to precisely locate the bearing stop in the shaft bore at the target location, which increases the complexity of assembling the valve. For example, a bushing stop that is positioned in the shaft bore a distance between 0.010 to 0.015 inches of the target location may cause the valve trim to be improperly aligned within the valve body. An improperly aligned valve trim, for example, may not provide a tight seal when the valve is in a closed position. In some examples, a bushing stop composed of nickel alloy material may gall, making it difficult to properly position the bushing stop in the shaft bore at the target location. In some instances, an improperly located bushing in the shaft bore may not be repositioned (e.g., within 0.010 to 0.015 inches of the target location), thereby resulting in a defective or unusable valve body.

The example valve body insert apparatus and related methods disclosed herein protect surfaces of a valve body made of low corrosive or erosive resistant from corrosive or erosive conditions or environments. The example valve body insert apparatus disclosed herein may be positioned on wetted surfaces of a valve body. In particular, the example valve body insert apparatus disclosed herein line the wetted surfaces of a valve body made of low corrosion resistant material such as carbon steel with a relatively higher corrosion resistant material such as nickel alloy material(s). For example, the valve body insert apparatus disclosed herein may be used to line an inner surface of a shaft bore of a valve body. In some examples, the example valve body insert apparatus disclosed herein may be employed combination with cladding material. For example, a cladding material may be applied to wetted surfaces that are readily accessible by equipment (e.g., a probe tip) used to apply cladding and the example valve body insert apparatus disclosed herein may be applied to wetted surfaces of a valve body that are not easily accessible by equipment used to apply (e.g., weld) the cladding to a valve body. In this manner, the example valve body insert apparatus disclosed herein significantly decrease manufacturing costs associated with the time required to apply cladding to areas of a valve body that are difficult to access. The example valve body insert apparatus disclosed herein may be employed with rotary valves having a nominal pipe size (NPS) of 16 or less. In some examples, the valve body insert apparatus disclosed herein may be employed with rotary valves having a nominal pipe size (NPS) of 18 or greater. The example valve body insert apparatus disclosed herein may be composed of highly corrosion or erosion resistant material such as, for example, nickel alloy material(s). Thus, the example valve body insert disclosed herein may be made of the same material as the cladding material (e.g., Inconel material).

Additionally or alternatively, in some examples, the example insert apparatus disclosed herein facilitate assembly of a valve. For example, the example valve body insert apparatus disclosed herein properly and/or accurately locate valve trim assembly within a fluid flow passageway of the valve. In some examples, the example valve body insert apparatus disclosed herein provide an integral bearing stop. In contrast to known rotary valves that employ a bearing stop positioned within a shaft bore via press-fit, the example valve body insert apparatus disclosed herein provide a bearing stop or integral bushing that allows for a bearing to be positioned in a correct location without requiring a press-fit operation, thereby significantly reducing manufacturing complexity. The example valve body insert apparatus may include a locator (e.g., a flange or a shoulder) to allow the valve body insert to be properly and/or accurately positioned (e.g., at a target location) inside a shaft bore of a valve body during assembly. In this manner, the valve body insert apparatus properly aligns a valve trim assembly relative to a fluid flow passageway of the valve. In some examples, the valve body insert apparatus disclosed herein include a packing cup or cavity to receive a packing assembly. In some examples, the valve body insert apparatus disclosed herein provide an integral packing box ring on a drive side portion of a rotary valve body, thereby eliminating the need to procure a packing box ring (e.g., a packing box ring made of nickel alloy). Thus, the example valve body insert apparatus disclosed herein facilitates manufacturing and/or protects low corrosion resistance material from harsh conditions.

FIG. 1 illustrates an example rotary valve 100 constructed in accordance with the teachings of this disclosure. In some examples, the example rotary valve 100 may be employed in high pressure differential applications and/or severely or highly erosive or corrosive applications (e.g., petrochemical applications, subsea applications, paper and pulp applications, etc.). The example rotary valve 100 includes a valve body 102 defining a fluid flow passageway 104 between an inlet 106 and an outlet 108. The valve body 102 houses a valve trim 110. An actuator (e.g., an electric actuator, a pneumatic actuator, etc.) operatively couples to the rotary valve 100 via the valve trim 110 to move the rotary valve between a first position or open to allow fluid flow through the fluid flow passageway 104 and a second position or closed position to prevent or restrict fluid flow through the fluid flow passageway 104.

Figure 2:
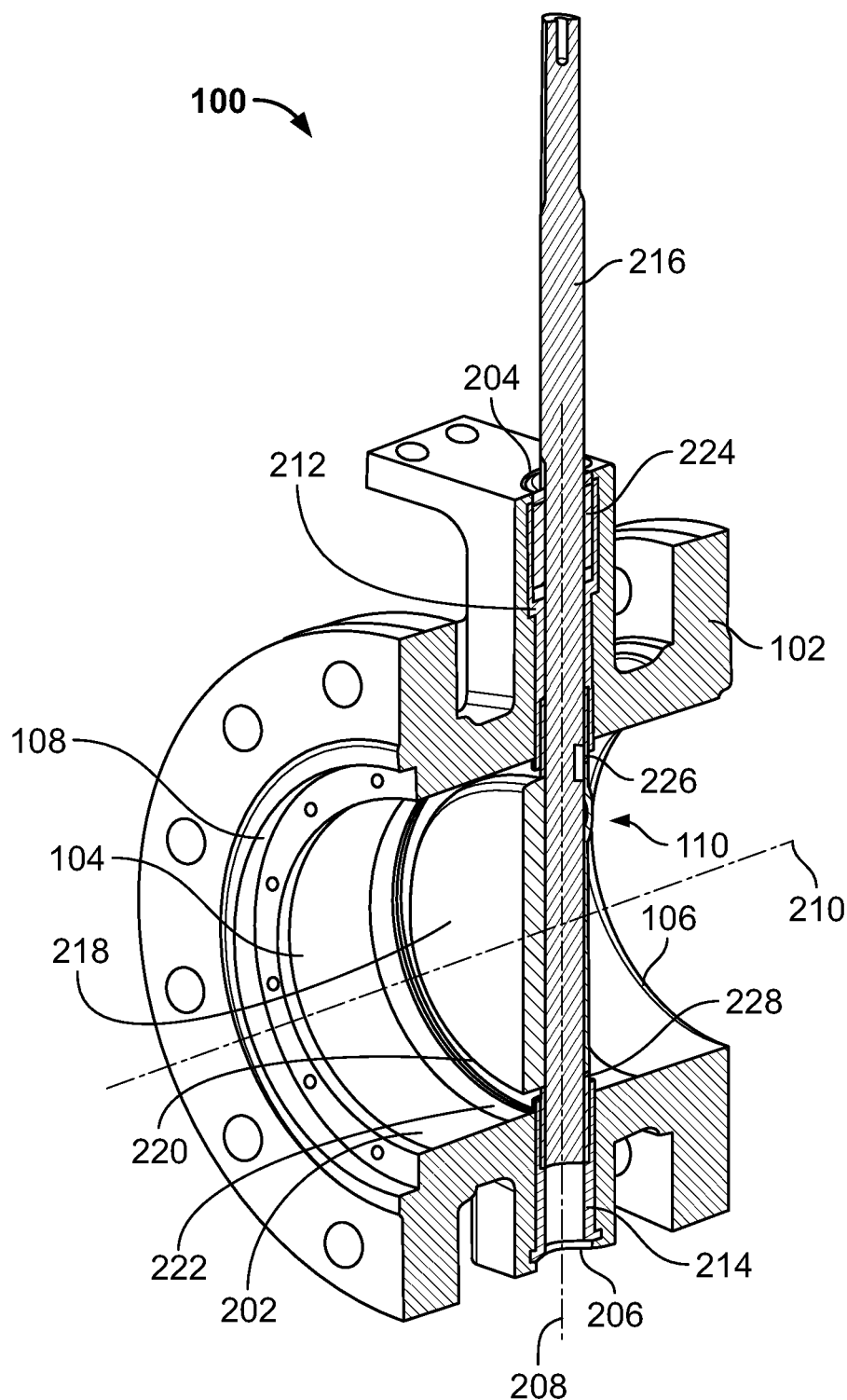
FIG. 2 is a sectional view of the example rotary valve shown in FIG. 1.

FIG. 2 is a sectioned view of the rotary valve 100 illustrated in FIG. 1. The valve body 102 is generally cylindrical and has a central opening 202 that defines the fluid flow passageway 104 between the inlet 106 and the outlet 108. The valve body 102 also has a first shaft bore 204 (e.g., a drive shaft opening or bore) and a second shaft bore 206 (e.g., a follower shaft opening or bore) to receive and/or position the valve trim 110 within the fluid flow passageway 104. The first shaft bore 204 and the second shaft bore 206 of the illustrated example are generally coaxially aligned and define a longitudinal axis 208 that is non-parallel (e.g., substantially perpendicular) relative to a longitudinal axis 210 of the central opening 202. The first shaft bore 204 and/or the second shaft bore 206 may have a diameter between approximately 2 inches and 3 inches. In some examples, a diameter of the first shaft bore 204 and/or the second shaft bore 206 may be less than 2 inches or greater than 3 inches. The valve body 102 of the illustrated example is made of a relatively low corrosion resistance material such as, for example, carbon steel.

To protect inner surfaces of the first shaft bore 204 and the second shaft bore 206 of the valve body 102 from wear and/or damage in severe fluid condition applications, the example rotary valve 100 of the illustrated example includes a first insert or sleeve 212 positioned in the first shaft bore 204 and a second insert or sleeve 214 positioned in the second shaft bore 206. In particular, the first insert 212 and the second insert 214 of the illustrated example protect the inner surfaces of the respective first and second shaft bores 204 and 206 without having to overlay cladding material (e.g., nickel alloy material) along the inner surfaces of the first shaft bore 204 and/or the second shaft bore 206 that are engaged or covered by (e.g., the outer surfaces 330 and 418 of) the first and the second inserts 212 and 214, respectively. In other words, the first and second inserts 212 and 214 of the illustrated example are provided in place of cladding material. The first and second inserts 212 and 214 significantly reduce manufacturing complexity because the first and second inserts 212 and 214 eliminate the need to overlay cladding material on the inner surfaces of the first shaft bore 204 and/or the second shaft bore 206. For example, applying or overlaying cladding material to shaft bores having a diameter less than 3 inches may be difficult to achieve because a probe tip of a welding apparatus may not fit inside a the first shaft bore 204 to apply or weld the cladding material to the inner surface of the first shaft bore 204. In some examples, the rotary valve 100 may employ only the first insert 212 and the second shaft bore 206 may be provided with the cladding material instead of the second insert 214. To protect the inner surfaces of the first and second shaft bores 204 and 206 from wear and/or damage, the first and second inserts 212 and 214 of the illustrated example are made of a highly corrosion resistant material such as, for example, nickel alloy, stainless steel and/or other material(s) having a relatively high corrosion resistance characteristic(s). The first and second inserts 212 and 214 may be formed via machining and/or any other manufacturing process(es).

In addition or as an alternative to protecting the first and second shaft bores 204 and 206 from corrosive conditions, the example first and second inserts 212 and 214 position or locate (e.g., align) the valve trim 110 relative to the fluid flow passageway 104 of the valve body 102. As a result, the first and second inserts 212 and 214 eliminate a need for a bearing stop typically used in some rotary valves, thereby significantly reducing manufacturing complexity (e.g., eliminating the press-fit operation noted above). When the first and second inserts 212 and 214 are used in non-corrosive or non-harsh environments and are provided to facilitate manufacturing and/or assembly of the rotary valve 100, the first and second inserts 212 and/or 214 may be composed of, for example, carbon steel or other low corrosion resistance material(s).

The valve trim 110 of the illustrated example includes a drive shaft 216 that is received by the first insert 212 and the second insert 214. The drive shaft 216 is coupled to a closure member 218 (e.g., via fasteners, pins, etc.) that is disposed within the fluid flow passageway 104 to control fluid flow between the inlet 106 and the outlet 108. In the illustrated example, the closure member 218 is a disk having a peripheral edge 220 that sealingly engages a valve seat or annular sealing surface 222 (e.g., a seal ring) disposed in the central opening 202 to prevent or restrict fluid flow through the rotary valve 100 when the rotary valve 100 is in the closed position. The drive shaft 216, via an actuator (e.g., an electric actuator), drives or rotates the closure member 218 between the closed position and the open position to control the flow of fluid through the rotary valve 100. In other example implementations, the closure member 218 can be any suitable closure member such as, for example, a ball valve, a segmented ball, etc. The rotary valve 100 may include a packing 224 that engages or surrounds the drive shaft 216 to prevent or restrict process fluid in the fluid flow passageway 104 from flowing up along the drive shaft 216 and to the environment via the first shaft bore 204. Bearings 226 and 228 aid the drive shaft 216 and the closure member 218 in alignment and rotation, and reduce friction when the drive shaft 216 rotates the closure member 218 between the open and closed positions. In particular, the first insert 212 positions the bearing 226 in the first shaft bore 204 and the second insert 214 positions the bearing 228 in the second shaft bore 206. For example, the first and second inserts 212 and 214 and the bearing 226 and 228 align (i.e., center) the closure member 218 in the fluid flow passageway 104 relative to the longitudinal axis 208 of the first and second shaft bores 204 and 206 and/or relative to the longitudinal axis 210 of the fluid flow passageway 104.

For example, in operation, a pressure of a process fluid flowing through the fluid flow passageway 104 of the valve body 102 from the inlet 106 is sensed in the second shaft bore 214 and applies a thrust load to the closure member 218 via the shaft 216 (e.g., an upward force in the orientation of FIG. 2). The bearings 226 and/or 228 absorb the thrust load exerted by the pressurized fluid to maintain the closure member 218 in alignment relative to the longitudinal axis 208 (e.g., vertical alignment) relative to the sealing surface 222. In addition, the bearings 226 and/or 228 prevent the closure member 218 from shifting axially (e.g., sideways or in a direction to the right in the orientation of FIG. 2) relative to the longitudinal axis 210 of the fluid flow passageway 104 when the pressurized fluid at the inlet 106 imparts a force against the closure member 218. Thus, the first and second inserts 212 and 214 properly position the bearings 226 and 228 in the fluid flow passageway 104 so that the closure member 218 is substantially centered and/or precisely positioned within the valve body 102. As a result, the peripheral edge 220 of the disk 218 can sealingly mate or engage the sealing surface 222 to prevent undesired leakage through the rotary valve 100 when the rotary valve 100 is in the closed position.

Figure 3A:
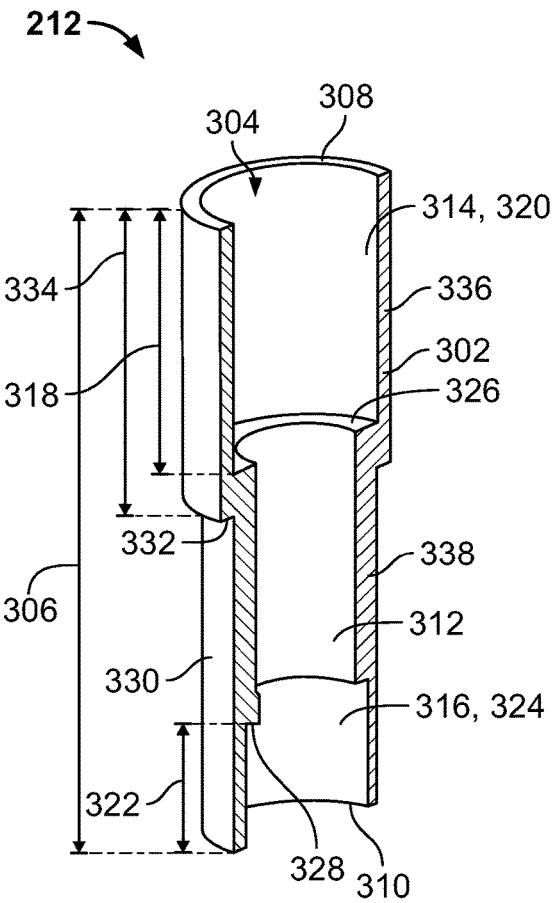
FIG. 3A is a sectioned view of a first example valve body insert apparatus in accordance with the teachings of this disclosure.
Figure 3B:
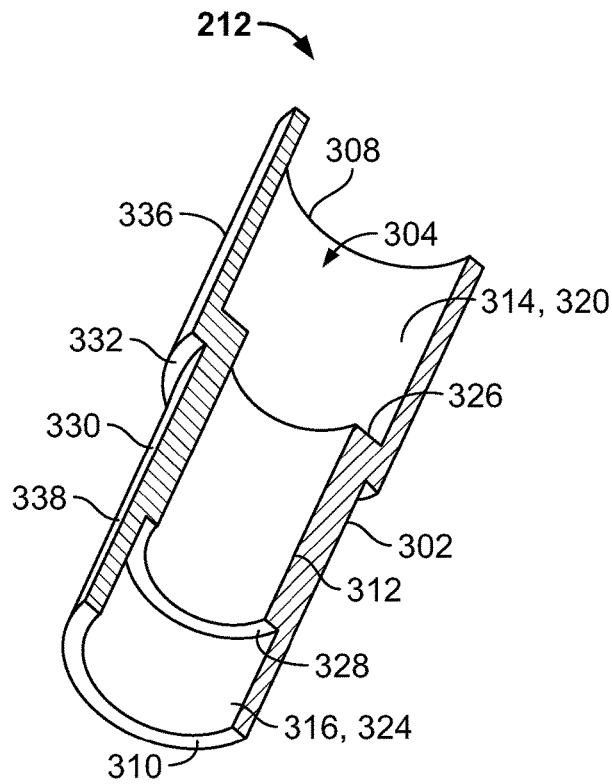
FIG. 3B is another view of the example valve body insert apparatus of FIG. 3A.

FIG. 3A is a sectioned view of the example first insert 212 of FIG. 2. FIG. 3B is another view of the example first insert 212 of FIG. 2. Referring to FIGS. 3A and 3B, the first insert 212 of the illustrated example includes a body 302 (e.g., a cylindrical body) defining a bore 304 through an overall length 306 of the body 302 between a first end 308 of the body 302 and a second end 310 of the body 302 opposite the first end 308 to provide a first opening 312. For example, the first opening 312 of the illustrated example has a first diameter that is slightly larger than a diameter of the drive shaft 216 (FIG. 2). Additionally, the first insert 212 of the illustrated example includes a first counterbore 314 and a second counterbore 316. The first counterbore 314 is adjacent the first end 308 of the body 302 and extends from the first end 308 along a first length 318 of the body 302 to define a second opening 320. The second counterbore 316 is adjacent the second end 310 of the body 302 and extends from the second end 310 along a second length 322 of the body 302 to define a third opening 324. In this manner, the bore 304 of the illustrated example has a multi-step profile to define the first opening 312, the second opening 320 and the third opening 324. Thus, the bore 304 of the first insert 212 includes a stepped profile defining the first opening 312 (e.g., a cavity) having a first inner diameter, the second opening 320 having a second inner diameter different than the first diameter, and the third opening 324 having a third inner diameter different than the first diameter and/or the second diameter. The multi-step profile bore 304 defines a first step, shoulder or first inner wall 326 formed in the bore 304 between the first opening 312 and the second opening 320, and a second step, shoulder or second inner wall 328 formed in the bore 304 between the first opening 312 and the third opening 324. In some examples, the first inner wall 326 may provide an integral packing ring box to support the packing 224. An outer surface 330 of the body 302 of the first insert 212 has a stepped profile to define an outer flange, shoulder, step or outer wall 332 (e.g., a locating flange) that may be used as a guide to properly locate or position the first insert 212 in the first shaft bore 204. The outer step 332 is positioned or formed along the body 302 at a distance 334 from the first end 308 of the body 302. Thus, the body 302 of the first insert 212 includes a first outer surface portion 336 having a first outer diameter and a second outer surface portion 338 having a second outer diameter different (e.g., smaller) than the first outer diameter.

Figure 4:
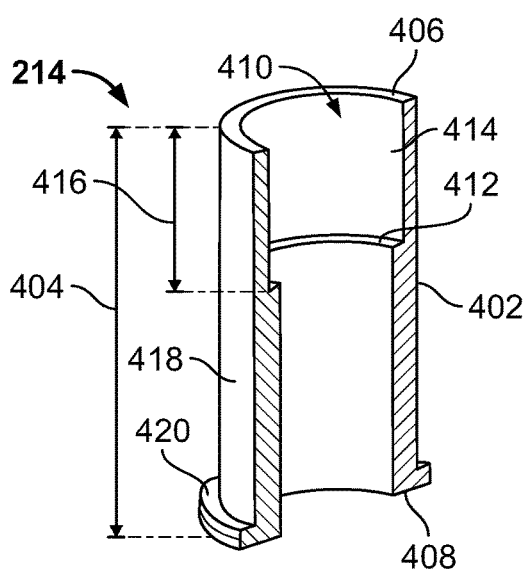
FIG. 4 is a sectioned view of a second example valve body insert apparatus in accordance with the teachings of this disclosure.

FIG. 4 is a sectioned view of the example second insert 214 of FIG. 2. The second insert 214 defines a body 402 (e.g., a cylindrical body) having an overall length 404 between a first end 406 and a second end 408 opposite the first end 406. The body 402 defines a bore 410 extending between the first end 406 and the second end 408. The bore 410 of the illustrated example has a stepped profile to define an inner wall, shoulder or step 412 (e.g., a flange). For example, a counterbore 414 extends partially along a length 416 of the body 402 to form the inner wall or step 412. An outer surface 418 of the second insert 214 includes a flange 420 adjacent the second end 408 of the body 42 that protrudes outwardly from the outer surface 416.

Figure 5:
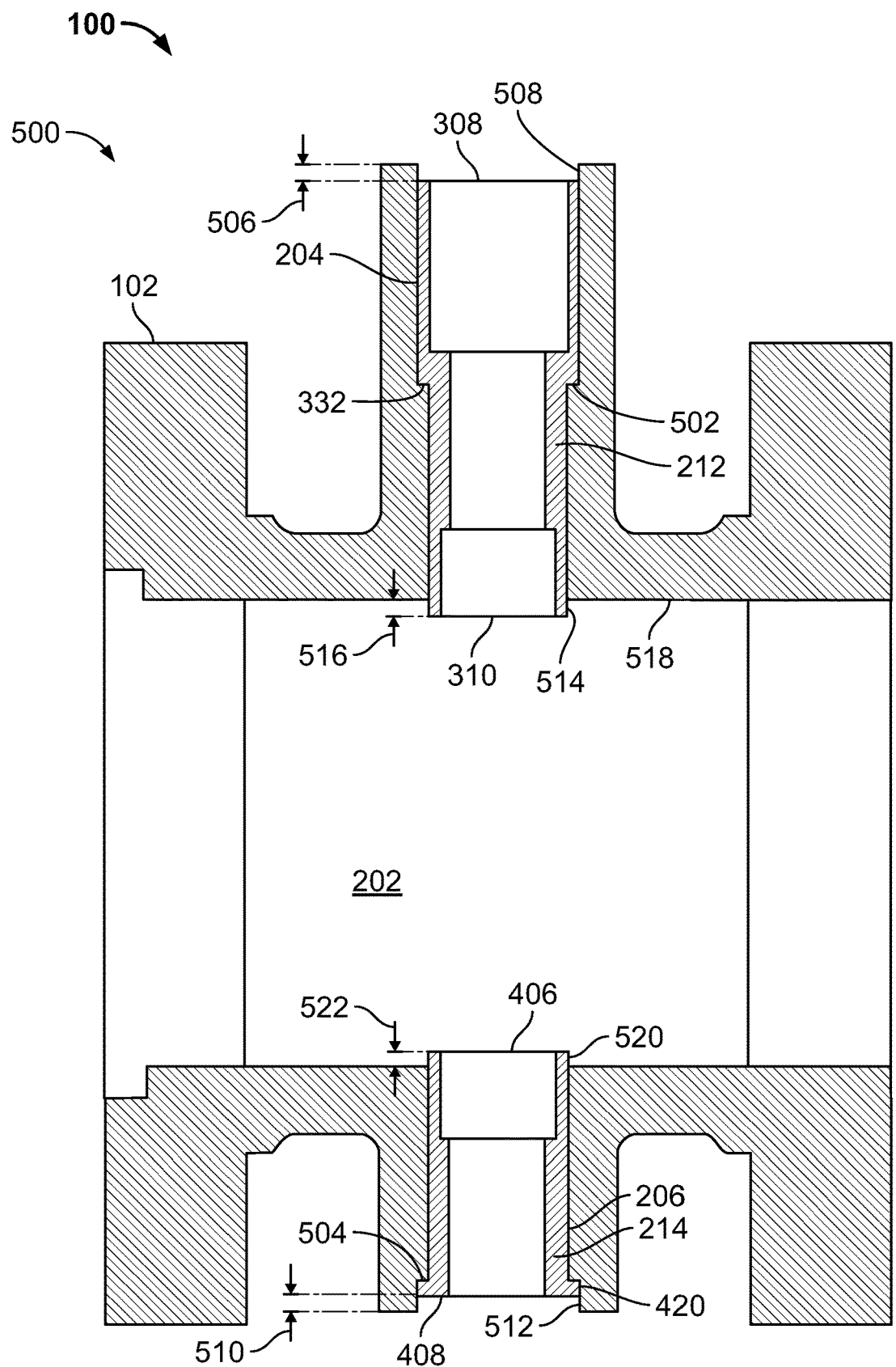
FIG. 5 is a cross-sectional view of the example rotary valve of FIGS. 1 and 2 shown in a partially assembled state.

FIG. 5 illustrates the example rotary valve 100 in a partially assembled state 500. In particular, the example partially assembled state 500 of FIG. 5 illustrates the first and second inserts 212 and 214 positioned in the respective first and second shaft bores 204 and 206. To assemble the first and second inserts 212 and 214 and the valve body 102, the example first and second inserts 212 and 214 can be dropped into the respective first and second shaft bores 204 and 206. In particular, the outer step 332 of the first insert 212 engages a wall or shoulder 502 of the valve body 102 to locate the first insert 212 in the first shaft bore 204 at a desired location. Similarly, the outer flange 420 of the second insert 214 engages a wall or shoulder 504 of the valve body 102 to locate the second insert 214 in the second shaft bore 206 at a desired location. When positioned in the respective first and second shaft bores 204 and 206, the first and second inserts 212 and 214 are coupled or attached to the valve body 102 via, for example, welding.

As shown in FIG. 5, the first insert 212 extends substantially an entire length of the first shaft bore 204 and the second insert 214 extends substantially an entire length of the second shaft bore 206. For example, in the illustrated example, the first end 308 of the first insert 212 is recessed a distance 506 relative to an opening 508 of the first shaft bore 204 and the second end 408 of the second insert 214 is recessed a distance 510 relative to an opening 512 of the second shaft bore 206. More specifically, the only portion of the first shaft bore 204 that is not covered by the first insert 212 corresponds to the distance 506, and the only portion of the second shaft bore 206 that is not covered by the second insert 214 corresponds to the distance 510. Further, in the illustrated example, a portion 514 of the first insert 212 adjacent the second end 310 projects or protrudes into the fluid flow passageway a distance 516 from an inner wall 518 of the central opening 202. Similarly, a portion 520 of the second insert 214 adjacent the first end 406 projects or protrudes into the fluid flow passageway 104 a distance 522 from the inner wall 518 of the central opening 202. Projecting the respective portions 514 and 520 of the first and second inserts 212 and 214 into the fluid flow passageway 104 facilitates a cladding operation (e.g., attachment of the cladding material). In this manner, cladding material can encase, overlap or overlay the portions 514 and 520 of the ends 310 and 406 of the first and second inserts 212 and 214 that project into the fluid flow passageway 104. In some examples, the respective ends 310 and 406 may be recessed in the respective first and second shaft bores 204 and 206 and/or the respective ends 308 and 408 may protrude past the openings 508 and 512 of the respective first and second shaft bores 204 and 206.

Figure 6:
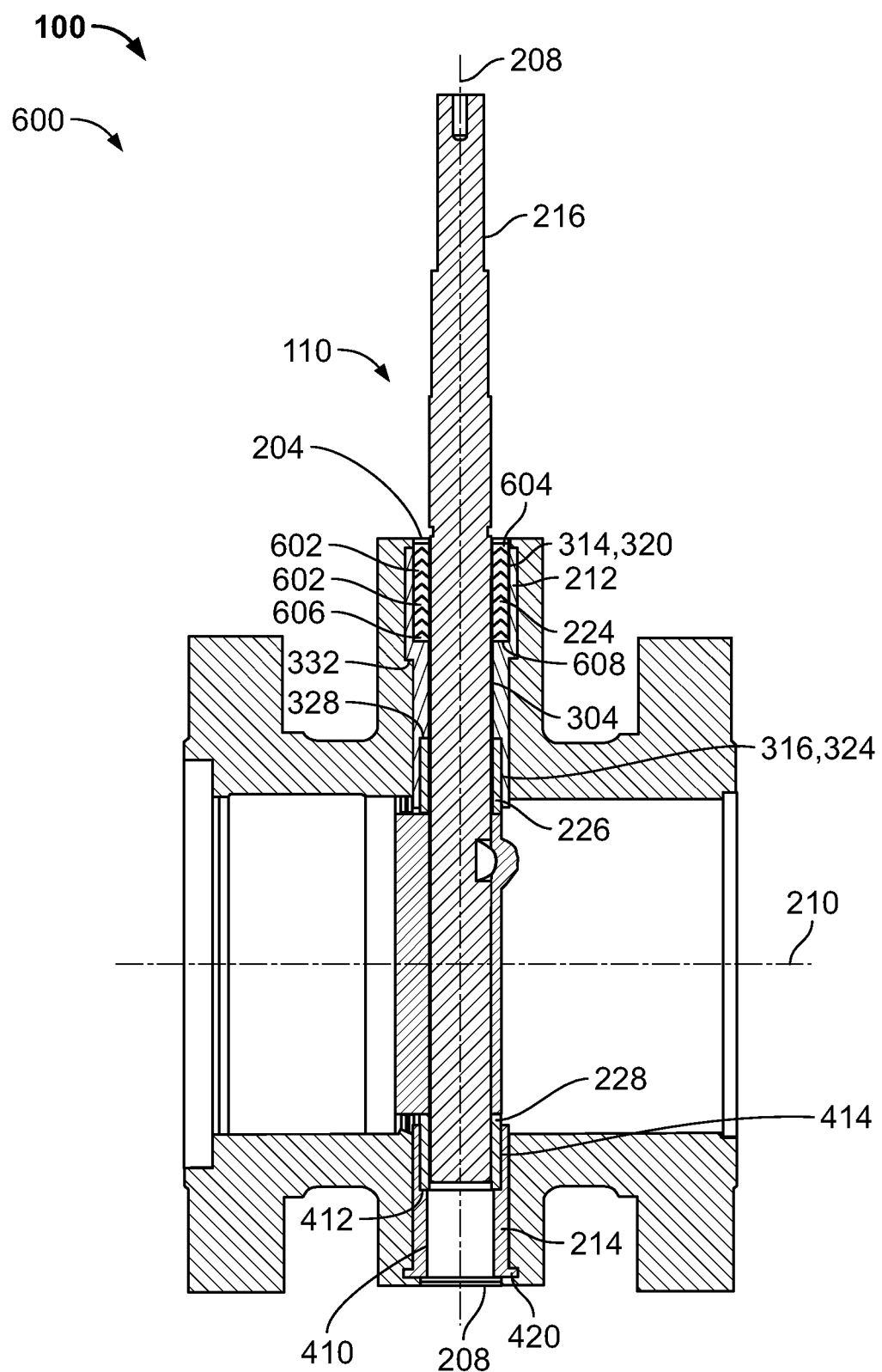
FIG. 6 is a cross-sectional view of the example rotary valve of FIGS. 1 and 2 shown in another partially assembled state.

FIG. 6 illustrates the example rotary valve 100 in another partially assembled state 600. In particular, the example rotary valve 100 shown in FIG. 6 includes the valve trim 110 coupled to the first and second inserts 212 and 214. In the illustrated example, the drive shaft 216 extends through the bore 304 of the first insert 212 and at least partially through the bore 410 of the second insert 214. In some examples, the drive shaft 216 only extends through the bore 304 of the first insert 212. In some such examples, the valve trim 110 may include a follower shaft coupled to the closure member 218 and the follower shaft is received by the bore 410 of the second insert 214. In the illustrated example of FIG. 6, the packing 224 is disposed or positioned in the second opening 320 formed by the first counterbore 314 of the first insert 212. The example packing 224 includes a plurality of packing rings 602 positioned between a first adaptor 604 (e.g., a female adaptor) and a second adaptor 606 (e.g., a male adaptor). As noted above, the first insert 212 defines an integral packing box ring 608 that supports the packing 224 (e.g., the plurality of packing rings 602). In addition, the bearing 226 is positioned or partially positioned in the third opening 324 formed by the second counterbore 316 of the first insert 212. In particular, the second inner wall 328 of the third opening 324 provides a bearing stop that prevents or restricts the bearing 226 from moving in a direction along the longitudinal axis 208. The bearing stop provided by the second inner wall 328 and/or the outer wall 332 of the first insert 212 properly locates the bearing 226 in the first shaft bore 204. In the illustrated example, the bearing 226 is captured between the wall 328 of the first insert 212 and the closure member 218. Thus, the bearing 226 is prevented or restricted from moving along the longitudinal axis 208. The first insert 212 facilitates alignment of the valve trim 110 (e.g., the closure member 218 relative to the seal 222) relative to the longitudinal axis 210 of the fluid flow passageway 104. Further, engagement between the bearing 226 and the body portion 338 of the first insert 212 prevents or restricts movement of the closure member 218 in a direction relative to the longitudinal axis 210. In addition, the bearing 228 is disposed or at least partially positioned in the opening 414 of the second insert 214. The bearing 228 is captured or located between the inner wall 412 of the second insert 214 and the closure member 218. Thus, the bearing 228 is prevented or restricted from moving along the longitudinal axis 208. The inner wall 412 properly locates the bearing 228 in the second shaft bore 206 to facilitate alignment of the valve trim 110 (e.g., the closure member 218 relative to the seal 222) relative to the longitudinal axis 210 of the fluid flow passageway 104. Further, engagement of the bearing 228 and the second insert 214 prevents or restrict movement of the closure member 218 in a direction relative to the longitudinal axis 210. As a result, the first and second inserts 212 and 214 (e.g., the inner walls 328 and 412, the outer wall 332, and the flange 420) aid the bearings 226 and 228, the drive shaft 216 and the closure member 218 in alignment relative to the longitudinal axis 208 and/or relative to the longitudinal axis 210.

Figure 7:
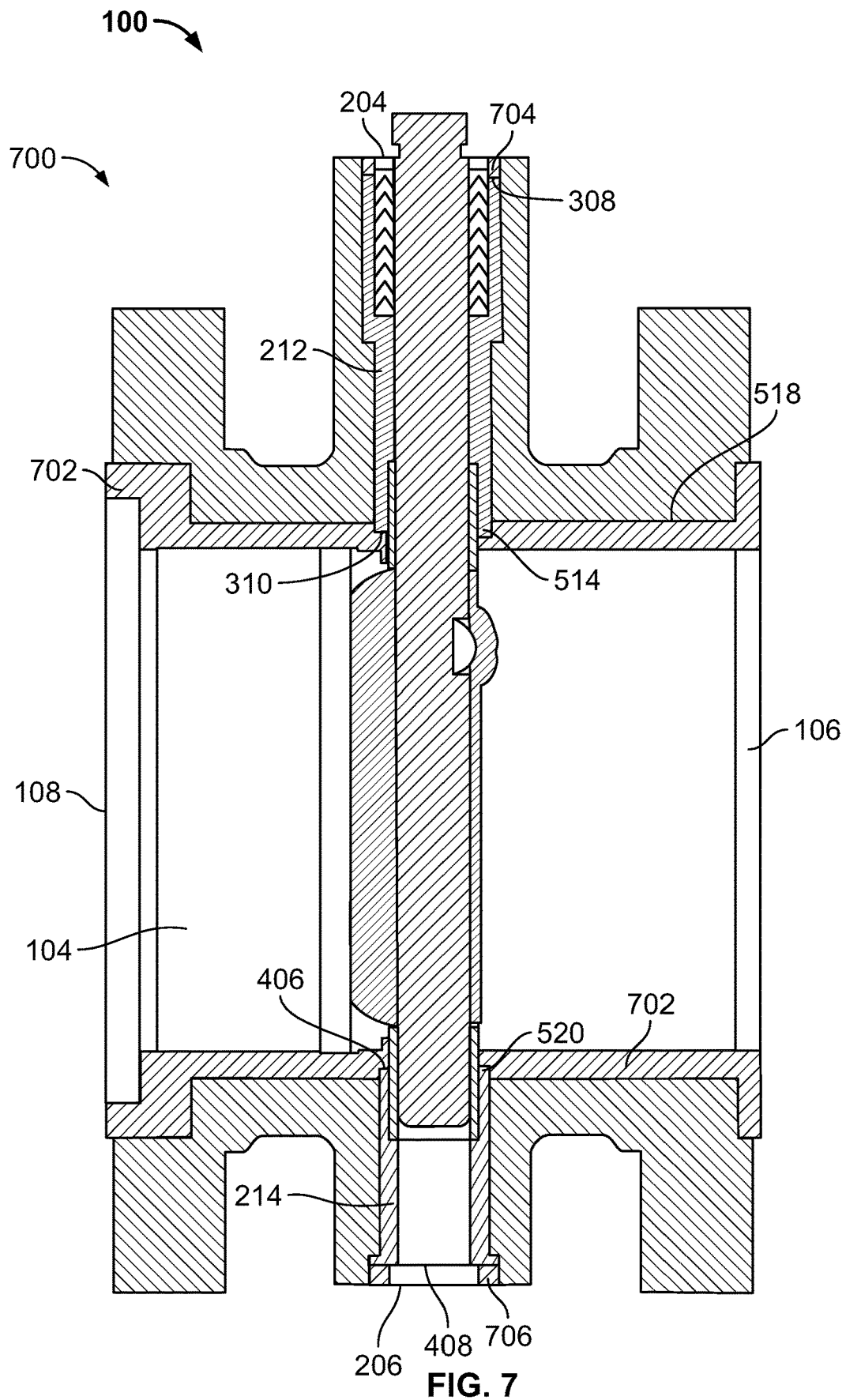
FIG. 7 is a cross-sectional view of the example rotary valve of FIGS. 1 and 2 implemented with a cladding material.

FIG. 7 illustrates the rotary valve 100 in a fully assembled state 700. In the fully assembled state 700, the example rotary valve 100 includes an overlay of cladding material 702 applied or provided to the inner surface 518 (e.g., wetted surfaces) of the fluid flow passageway 104. As shown in FIG. 7, the cladding material 702 engages or overlaps the portions 514 and 520 adjacent the ends 310 and 406 of the first and second inserts 212 and 214 that project past the inner surface 518 of the valve body 102 and into the fluid flow passageway 104. In the illustrated example, cladding material 704 is also provided in the first shaft bore 204 adjacent the first end 308 of the first insert 212 and cladding material 706 is provided in the second shaft bore 206 adjacent the second end 408 of the second insert 214. The cladding materials 704 and 706 in the respective first and second shaft bores 204 and 206 protect inner surfaces of the respective first and second shaft bores 204 and 206 that are exposed and/or not covered or protected by the respective first and second inserts 212 and 214. As shown in FIG. 7, the cladding material 702, 704 and/or 706 is not provided or applied to any surfaces of the valve body 102 (i.e., to portions of the inner surfaces of the first and second shaft bores 204 and 206) that are covered, lined and/or protected by the first and second inserts 212 and 214. Thus, the cladding material 702, 704 and/or 706 is applied to wetted surfaces of the rotary valve 100 that are easily accessible by equipment (e.g., a probe tip) during assembly. The first and second inserts 212 and 214 cover wetted surfaces of the rotary valve 100 which are not accessible by cladding equipment. The cladding material 702, 704 and 706 and the first and second inserts 212 and 214 may be composed of the same material (e.g., Inconel) and protect (e.g., wetted surfaces of) the valve body 102 from corrosive and/or erosive fluid conditions.

Although certain apparatus, methods and articles of manufacture have been described herein, the scope of coverage of this patent is not limited thereto. To the contrary, this patent covers all apparatus, methods and articles of manufacture fairly falling within the scope of the appended claims either literally or under the doctrine of equivalents.

What is claimed is:

1. A rotary valve comprising:
a valve body having a fluid flow passageway and a first shaft bore, the fluid flow passageway defining a first axis and the first shaft bore defining a second axis that is substantially non-parallel relative to the first axis of the fluid flow passageway, the valve body defining a first shoulder located in the first shaft bore between a first end of the first shaft bore and a second end of the first shaft bore opposite the first end;
a first insert positioned in the first shaft bore, the first insert having an outer surface defining an outer step located between a first edge of the first insert and a second edge of the first insert opposite the first edge, the outer step to engage the first shoulder of the first shaft bore to locate the first insert in the first shaft bore at a desired location, the first edge being recessed relative to the first end of the first shaft bore and the second edge to at least partially extend in the fluid flow passageway beyond the second end of the first shaft bore opposite the first end, the first insert to engage an inner surface of the first shaft bore at an interface between the first shaft bore and the fluid flow passageway, the first insert to protect the inner surface of the first shaft bore from corrosion;
a first cladding material applied to wetted surfaces of the fluid flow passageway, the first cladding material to at least partially encase the second edge of the first insert; and
a second cladding material applied adjacent the first end of the first shaft bore, the second cladding material to at least partially encase the first edge of the first insert such that the first insert is positioned between the first cladding material and the second cladding material.

2. The rotary valve as defined in claim 1, wherein the first insert has a cylindrical body defining an inner surface and an outer surface.

3. The rotary valve as defined in claim 2, wherein the first insert includes a longitudinal bore extending through an entire length of the cylindrical body defining a first opening to receive a drive shaft of the rotary valve.

4. The rotary valve as defined in claim 3, wherein the first insert includes an integral packing ring box.

5. The rotary valve as defined in claim 1, further comprising a second shaft bore coaxially aligned with the first shaft bore, the first shaft bore and the second shaft bore defining the second axis.

6. The rotary valve as defined in claim 5, further comprising a second insert positioned within the second shaft bore.

7. A rotary valve comprising:
a valve body having a fluid flow passageway and a first shaft bore, the fluid flow passageway defining a first axis and the first shaft bore defining a second axis that is substantially non-parallel relative to the first axis of the fluid flow passageway;
a first insert positioned in the first shaft bore, the first insert having a first edge recessed relative to a first end of the first shaft bore and a second edge to at least partially extend in the fluid flow passageway beyond a second end of the first shaft bore opposite the first end, the first insert having a cylindrical body defining an inner surface and an outer surface and a longitudinal bore extending through an entire length of the cylindrical body defining a first opening to receive a drive shaft of the valve, the first insert including a counterbore defining a second opening to receive a bushing, the second opening coaxially aligned with the first opening, the first insert to engage an inner surface of the first shaft bore at an interface between the first shaft bore and the fluid flow passageway, the first insert to protect the inner surface of the first shaft bore from corrosion;
a first cladding material applied to wetted surfaces of the fluid flow passageway, the first cladding material to at least partially encase the second edge of the first insert; and
a second cladding material applied adjacent the first end of the first shaft bore, the second cladding material to at least partially encase the first edge of the first insert such that the first insert is positioned between the first cladding material and the second cladding material.

8. The rotary valve as defined in claim 7, wherein the second opening has a diameter that is greater than a diameter of the first opening.

9. The rotary valve as defined in claim 7, wherein the first insert includes a cavity to receive a packing assembly, the cavity coaxially aligned with the first opening.

10. The rotary valve as defined in claim 9, wherein the cavity has a diameter that is greater than a diameter of the first opening.

11. A rotary valve assembly comprising:
a valve body defining a fluid flow passageway between an inlet and an outlet, the valve body having a drive shaft bore formed on a drive side portion of the valve body;
a first insert positioned in the drive shaft bore and coupled to the valve body to line an inner surface of the drive shaft bore leading to the fluid flow passageway, wherein the first insert is configured to protect the inner surface of the drive shaft bore from corrosion or erosion, the first insert including:
a first counterbore to receive a first bushing, the first counterbore defining a first inner wall to restrict movement of the first bushing; and
a stepped outer wall formed on an outer surface of the first insert, the stepped outer wall to be positioned in the drive shaft bore and to engage the valve body to position the first insert in the drive shaft bore; and
a cladding material provided in the fluid flow passageway, the cladding material to at least partially encase the first insert and the first bushing, the cladding material to encase wetted surfaces of the fluid flow passageway between the inlet and the outlet, wherein the cladding material is not applied to an inner surface of the drive shaft bore that is lined by the first insert.

12. The rotary valve assembly of claim 11, wherein the first insert includes a second counterbore to define a cavity that receives a packing assembly.

13. The rotary valve assembly of claim 11, wherein the stepped outer wall is formed adjacent a midpoint of a longitudinal length of the first insert.

14. The apparatus of claim 11, wherein at least a portion of the first bushing extends into the fluid flow passageway and is exposed to fluid.

15. The rotary valve assembly of claim 11, further comprising a follower shaft bore formed in a follower side portion of the valve body.

16. The rotary valve assembly of claim 15, further comprising a second insert positioned in the follower shaft bore, the second insert having a second counterbore to receive a second bushing, the second counterbore defining a second inner wall to restrict movement of the second bushing.

17. The rotary valve assembly of claim 16, wherein the cladding material is to at least partially encase the second insert and the second bushing.

18. An apparatus comprising:
a valve body made of a first material having a low corrosion or erosion resistant characteristic, the valve body defining a fluid flow passageway and a first shaft bore;
a first sleeve positionable in the first shaft bore to line a first inner surface of the first shaft bore to protect the first inner surface of the first shaft bore from corrosion or erosion, the first sleeve made of a second material different than the first material, the second material having a higher corrosion or erosion resistance characteristic than the first material, the first sleeve having a cylindrical body that includes a first end and a second end opposite the first end, wherein the first end is positioned adjacent a third end of the first shaft bore and the second end is positioned adjacent a fourth end of the first shaft bore; and
a cladding material positioned adjacent the third end of the first shaft bore and adjacent the fourth end of the first shaft bore such that cladding material engages the first end of the first insert and the second end of the first insert, wherein cladding material is not applied to portions of the first inner surface of the first shaft bore covered by the first insert.

19. The apparatus of claim 18, wherein the valve body defines a second shaft bore coaxially aligned with the first shaft bore, and further comprising a second sleeve positioned in the second shaft bore to line a second inner surface of the second shaft bore to protect the second inner surface of the first shaft bore from corrosion or erosion, the second sleeve made of a third material different than the first material, the third material having a higher corrosion or erosion resistance characteristic than the first material, the second sleeve having a cylindrical body that includes a fifth end and a sixth end opposite the fifth end, wherein the fifth end is positioned adjacent a seventh end of the second shaft bore and the sixth end is positioned adjacent an eighth end of the second shaft bore, wherein the cladding material is positioned adjacent the seventh end of the second shaft bore and adjacent the eighth end of the second shaft bore such that cladding material engages the fifth end of the second insert and the sixth end of the second insert, wherein cladding material is not applied to portions of the second inner surface of the second shaft bore covered by the second insert.

20. The apparatus of claim 19, wherein the second sleeve defines a body having an outer step that is to engage a shoulder of the second shaft bore to locate the second sleeve in the second shaft bore at a desired location.

21. The apparatus of claim 18, wherein the first sleeve is to receive a drive shaft coupled to a flow control member that controls fluid flow through the fluid flow passageway of the valve body.

22. The apparatus of claim 21, wherein the first sleeve defines a body having an opening between a first end of the body and a second end of the body opposite the first end to receive the drive shaft.

23. The apparatus of claim 22, wherein the body defines an outer step located between the first end and the second end of the body, the outer step to engage a shoulder positioned inside the first shaft bore of the valve body to locate the sleeve in the first shaft bore at a desired location.

24. The apparatus of claim 22, wherein the opening includes a stepped profile defining a first opening having a first diameter, a second opening having a second diameter, and a third opening having a third diameter, the second opening positioned between the first opening and the third opening, the first opening and the second opening defining a first inner wall and the second opening and the third opening defining a second inner wall.

25. The apparatus of claim 24, wherein the first inner wall defines a packing ring box to support a packing assembly and the second inner wall provides a bearing stop to restrict movement of a bearing toward the first opening.

* * * * *